US005309788A

United States Patent [19]

Summerfield

[11] Patent Number: 5,309,788

[45] Date of Patent: May 10, 1994

[54] TILT COUPLING

[76] Inventor: Michael D. Summerfield, Furze Cottage, West Beer, Cheriton Bishop, Exeter, Devon., England, EX6 6HF

[21] Appl. No.: 934,733

[22] PCT Filed: Feb. 8, 1991

[86] PCT No.: PCT/GB91/00203

§ 371 Date: Oct. 1, 1992

§ 102(e) Date: Oct. 1, 1992

[87] PCT Pub. No.: WO91/12143

PCT Pub. Date: Aug. 22, 1991

[30] Foreign Application Priority Data

Feb. 8, 1990 [GB] United Kingdom ................. 9002779
Feb. 8, 1990 [GB] United Kingdom ................. 9002780

[51] Int. Cl.[5] ............................................. F16H 53/00

[52] U.S. Cl. ..................................... 74/568 R; 108/7; 248/371; 411/537

[58] Field of Search ............... 74/60, 568 R; 248/371, 248/454, 474.1, 180; 411/537, 538; 403/97, 308; 108/1, 6, 7, 8

[56] References Cited

U.S. PATENT DOCUMENTS

| | | | |
|---|---|---|---|
| 683,405 | 9/1901 | Jaeger | 74/60 |
| 960,899 | 6/1910 | Guyer | 411/537 X |
| 3,010,339 | 11/1961 | Brock | 74/568 R |
| 3,018,992 | 1/1962 | Lore | 248/180 |
| 3,364,810 | 1/1968 | Hickerson | 248/180 X |
| 3,739,478 | 6/1973 | Elenberger | 33/75 R |
| 4,533,103 | 8/1985 | Ina | 248/180 X |

FOREIGN PATENT DOCUMENTS

| | | |
|---|---|---|
| 2025003 | 12/1971 | Fed. Rep. of Germany . |
| 2154349 | 5/1973 | France . |
| 2546824 | 12/1984 | France . |
| 795474 | 5/1958 | United Kingdom . |

*Primary Examiner*—Allan D. Herrmann
*Assistant Examiner*—David W. Laub
*Attorney, Agent, or Firm*—Edwin D. Schindler

[57] ABSTRACT

A tilt couple device having a pair of mounting members with each member having a wedge-shape cam. At least one of the cams has teeth on it that engages a pinion on an operating shaft. Rotation of the operating shaft causes the pinion to rotate one cam member relative to the other in order to change the inclination of one mounting surface relative to the other.

2 Claims, 5 Drawing Sheets

TILT COUPLING

This invention relates to drawing apparatus which includes a drawing board or easel for use by artists, draughtsmen and architects for example. Such boards or easels may be used to support a sheet of canvas, card or paper whilst the user makes a sketch or drawing or does a painting or plan or writes upon it. This invention also relates to a tilt coupling device for use in the drawing apparatus, but having other uses also.

Existing drawing boards are often provided with some form of stand, enabling the board to be placed on a table or stood on the floor or ground for use. The latter form of support is often used by artists for sketching or painting outdoor scenes. However, some artists find the. conspicuousness of using such a drawing board unacceptable, particularly if they are novices in the field. In addition, existing supports are not ideal for use at night or in inclement weather.

U.S. Pat. No. 3,739,478 discloses a clipboard for attachment to the steering wheel of a motor vehicle. A circular baseplate has adjustable spring clips for snapping over a steering wheel, and a circular board is rotatably mounted on the baseplate. U.S. Pat. No. 4,139,217 discloses a desk which is provided with spring clips to mount on a steering wheel. In both of these earlier proposals the board is inclined at the same angle as the steering wheel so that with most if not all motor vehicles the board may be in the wrong position for many uses.

In accordance with this invention there is provided a drawing apparatus comprising a drawing board having mounting means for mounting the drawing board on the steering wheel of a motor vehicle, the mounting means being arranged so that the drawing board can be mounted in a plurality of different inclinations relative to the wheel.

The mounting means may comprise a pair of limbs which project from the rear of the drawing board and which can be folded to a stowed position against the rear of the drawing board. The mounting means may further comprise a support plate which projects from the rear of the drawing board and which can be folded to a stowed position generally parallel with the rear of the board or easel. The support plate is preferably coupled to a swivel plate which is coupled to the rear of the drawing board for rotation about an axis which is substantially normal to the plane of the drawing board.

The drawing apparatus preferably includes a viewfinder comprising a viewing member provided with a grid or index marks, the viewing member being mounted on an arm arrangement which is in turn secured to a device e.g. a clamp for attaching to the drawing board.

It is known in some precision optical instruments to vary the inclination of a main part of the instrument relative to a base by relative rotation of a pair of superimposed wedge-shaped cam members. Rotation is achieved simply by a pair of handles each secured to a respective cam member. Moreover, the instrument is held to the base by a spring metal joint located internally of the cam members, with the result that the instrument is only poorly fixed relative to the base.

In accordance with this invention there is provided a tilt coupling device comprising first and second mounting members having two wedge-shaped cam members, at least one of the cam members being rotatable relative to the other cam member and to the adjacent mounting member in order to change the inclination of one mounting member relative to the other, the device further comprising a series of teeth formed on one of the cam members, and a pinion meshed with said series of teeth and carried on an operating shaft, such that rotation of the operating shaft causes rotation of said one cam member relative to the other.

Preferably a slip ring is disposed between the opposed cam surfaces of the two cam members, the operating shaft being mounted to the slip ring and the pinion being mounted both with said series of teeth formed on said one cam member and with a series of teeth formed on the other cam member.

The tilt coupling device maybe used in the drawing apparatus, the drawing board being mounted to the first mounting member of the tilt coupling device and the second mounting member of the tilt coupling device being attachable to the steering wheel of a vehicle.

Embodiments of this invention will now be described by way of examples only and with reference to the accompanying drawings, in which.

Figure 1:
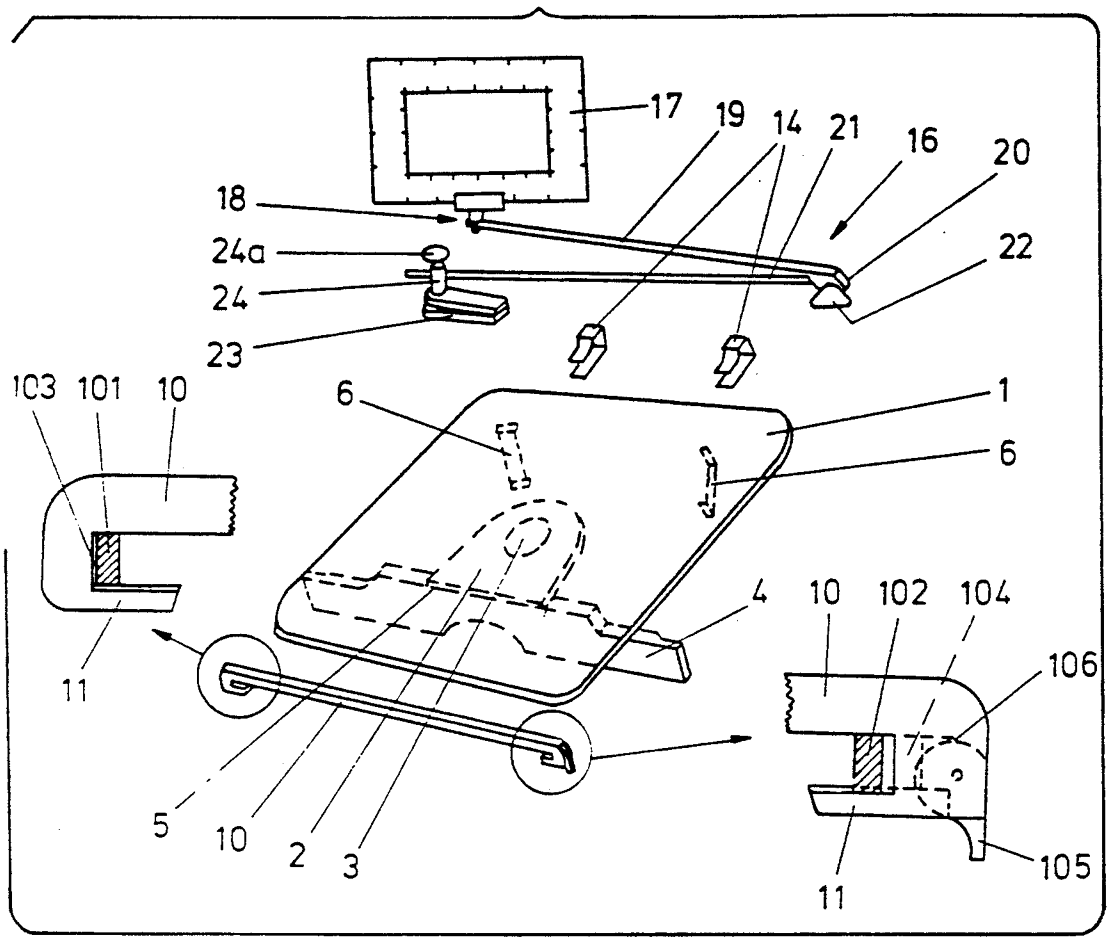
FIG. 1 is a general perspective view of a first embodiment of drawing apparatus in accordance with the invention, including inset details of parts of the apparatus.
Figure 2:
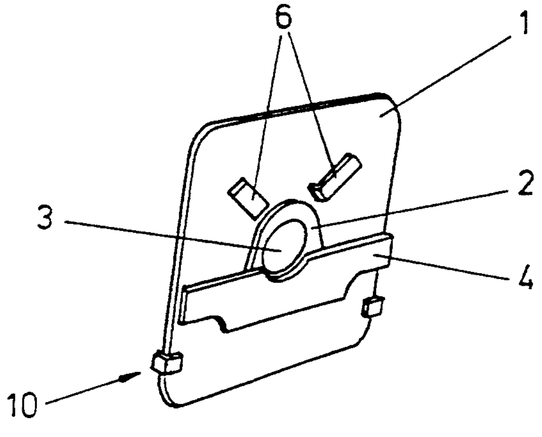
FIG. 2 is a perspective rear view of the drawing board only, when folded down.

Referring to FIG. 1 of the drawings, there is shown a drawing apparatus which comprises a substantially rectangular board 1 having a swivel plate 2 secured parallel to its rear face by a pivot 3 to rotate about an axis normal to the plane of the board and through substantially the centre of the board. A flat, elongate support plate 4 is hinged at 5 to one edge of the swivel plate 2 such that it can be swung from an extended position (FIG. 1) disposed at an angle of about 95° to 100° to the swivel plate, to a stowed position (FIG. 2) lying against the swivel plate. Towards the top of the board 1 a pair of spaced L-shaped hook elements 6 are hinged to the rear face of the board with the shorter limbs of the L projecting radially towards the pivot 3. The hook elements 6 can be swung from the extended position shown in FIG. 1 to a stowed position shown in FIG. 2, in which their longer limbs extend radially of the pivot 3 and their shorter limbs abut the rear of the board.

A support bar 10 having inturned flanges 11 at each end can be engaged over the board 1 with the flanges 11 located behind the side edges of the board. The bar can thus be slid up and down the board to any required position. The support bar may have a simple frictional engagement with the board to retain it in the required position, and the bar may thus act as a support for the lower edge of a sheet of paper or like material placed on the board. Instead of a friction grip the bar could be provided with clamping screws. In the illustrated board the internal faces at each end of the bar are provided with gripping pads 101, 102. One of the pads 101 is fixed and may have packing shims 103 placed behind its rear face. The other pad 102 is connected to a plunger 104 that is operable by a pivoted cam lever 105. A cam 106 on the cam lever 105 operates the plunger 104 so that as the lever 105 is moved from a horizontal position towards a depending vertical position as shown, the pad 102 is moved towards the other pad 101 to clamp the edges of the board 1 between the pads. The shims 103 provide fine adjustment for optimum clamping. A further adjustable bar can be provided so that the top and bottom edges of a canvas can be clamped between the two bars.

Spring clips 14 may also be provided to engage over an edge of the board, and these too can be used to secure a sheet of paper or the like to the board.

Figure 3:
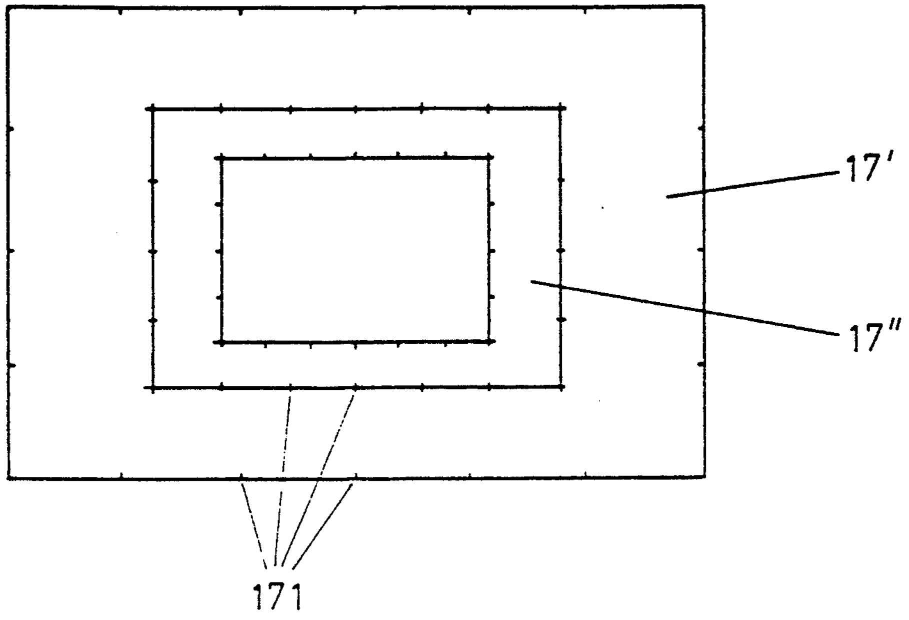
FIG. 3 is an enlarged view of a viewfinder included in the drawing apparatus.

The apparatus also includes a viewfinder indicated generally at 16 which can be used to support a flat rectangular viewing frame 17. The viewing frame is one of a set, two of which, 17' and 17", are shown in more detail in FIG. 3. These frames all fit snugly inside one another, and the corresponding inner and outer edges of each frame are provided with equal numbers of regularly spaced peripheral index marks 171. Each frame is slightly smaller than standard paper size (A4, A5 etc.) to allow the frame to be superimposed centrally on a sheet of paper of the appropriate size. The frame is then used as a template to draw a border on the paper, within which index marks are then added corresponding to those on the outer edge of the frame.

Referring to FIG. 1, the frame to be used is removably secured, e.g. by a clip with a friction grip, to a ball joint 18. This ball joint is mounted at one end of a first arm 19 which is hinged at 20 to a second arm 21. The hinge 20 incorporates a locking screw 22 for fixing the angular relationship between the arms 19 and 21. The second arm 21 carries a clamp 23 including a pair of jaws which are spring loaded into a closed position. The clamp is adjustably secured to the arm 21 by an apertured slide member 24 provided with a locking screw 24*a*, enabling the clamp to be secured at any desired position along the second arm 21.

The clamp 23 can be releasably secured to any suitable fixture within the vehicle, such as the edge of the board 1 or part of the trim of the vehicle. A magnet or suction cup could be used in place of the clamp 23. The user can adjust the viewing frame 17 into his/her field of vision so that a view or object outside the vehicle can be seen through the central aperture of the frame. The index marks on the inner edge of the frame correspond with those marked on the paper, albeit in a smaller scale, and can thus be used to guide the user in accurately transferring the view to the paper in the form of a drawing or sketch.

Figure 4:
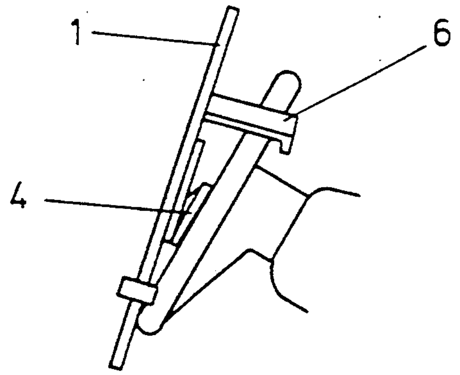
FIGS. 4 to 9 show the drawing board mounted on a steering wheel in six different positions.
Figure 5:
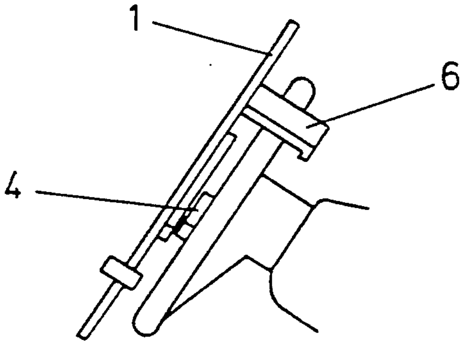
Figure 6:
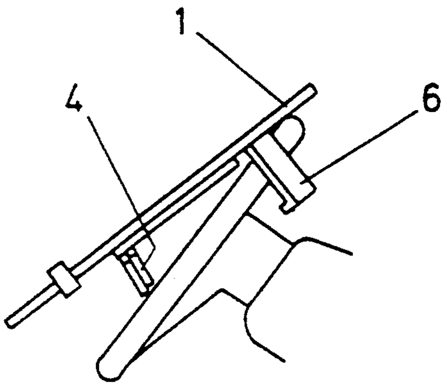

The angle of the board can be adjusted to the most comfortable position for a particular use by mounting the board on a steering wheel in one of a number of possible configurations. In the case of a steering wheel inclined at a relatively steep angle (FIGS. 4 to 6) the hook elements 6 can be extended and hooked over the top edge of the steering wheel: the support plate 4 is in a stowed position and the board rests against the lower edge of the wheel but the shorter limbs of the hook elements 6 abut the underside of the wheel. The board 1 will thus be inclined at a relatively steep angle as shown in FIG. 4. The board will however also rest stably if it is moved to lie flat against the wheel and therefore at a shallower angle, as shown in FIG. 5. By pivoting the support plate 4 to its extended position to rest across the steering wheel as shown in FIG. 6, the board can be inclinded at an even shallower angle. In this configuration the swivel plate can be rotated about the the pivot 3 to tilt the board to right or left, thereby improving the performance of the board for right or left-handed users respectively.

Figure 7:
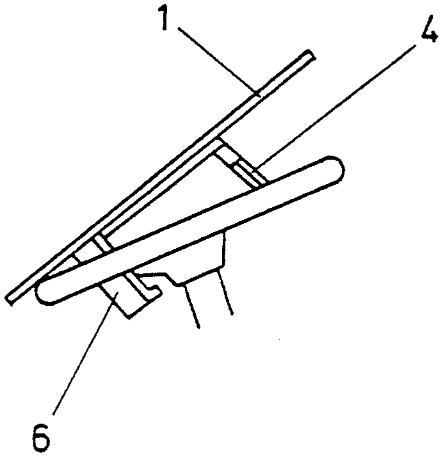
Figure 8:
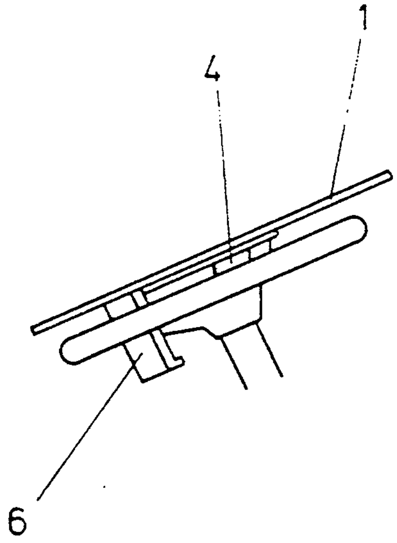
Figure 9:
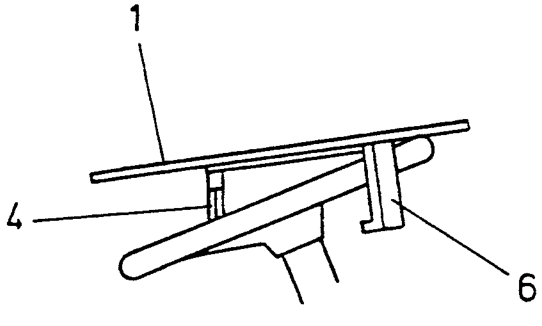

In the case of a steering wheel which is inclined at a smaller angle as shown in FIGS. 7 to 9, the board can be inverted and the support plate 4 extended to rest across the steering wheel with the hook elements 6, which are also extended, located inside the wheel rim (FIG. 7). In this configuration the board is inclined at a relatively steep angle, and can be tilted to right or left by rotating the support plate about the pivot 3 for right or left handed use. By folding the support plate to the stowed position (FIG. 8) the board will adopt a shallower angle generally parallel to the plane of the wheel. Finally, by mounting the board on the wheel in a non-inverted position with the support plate 4 extended and the hook elements located outside the upper rim of the wheel (FIG. 9) the board can be mounted almost horizontal. In each case the board is firmly mounted against the wheel in a stable condition.

The board is easy to mount on the steering wheel when the vehicle is parked and is equally quickly removed again before driving off.

An artist's easel of the kind comprising a spine and a pair of transverse clamping members with adjustable spacing can be used in place of the board 1.

The board could be provided with a parallel motion or pantograph system of known form.

Figure 10:
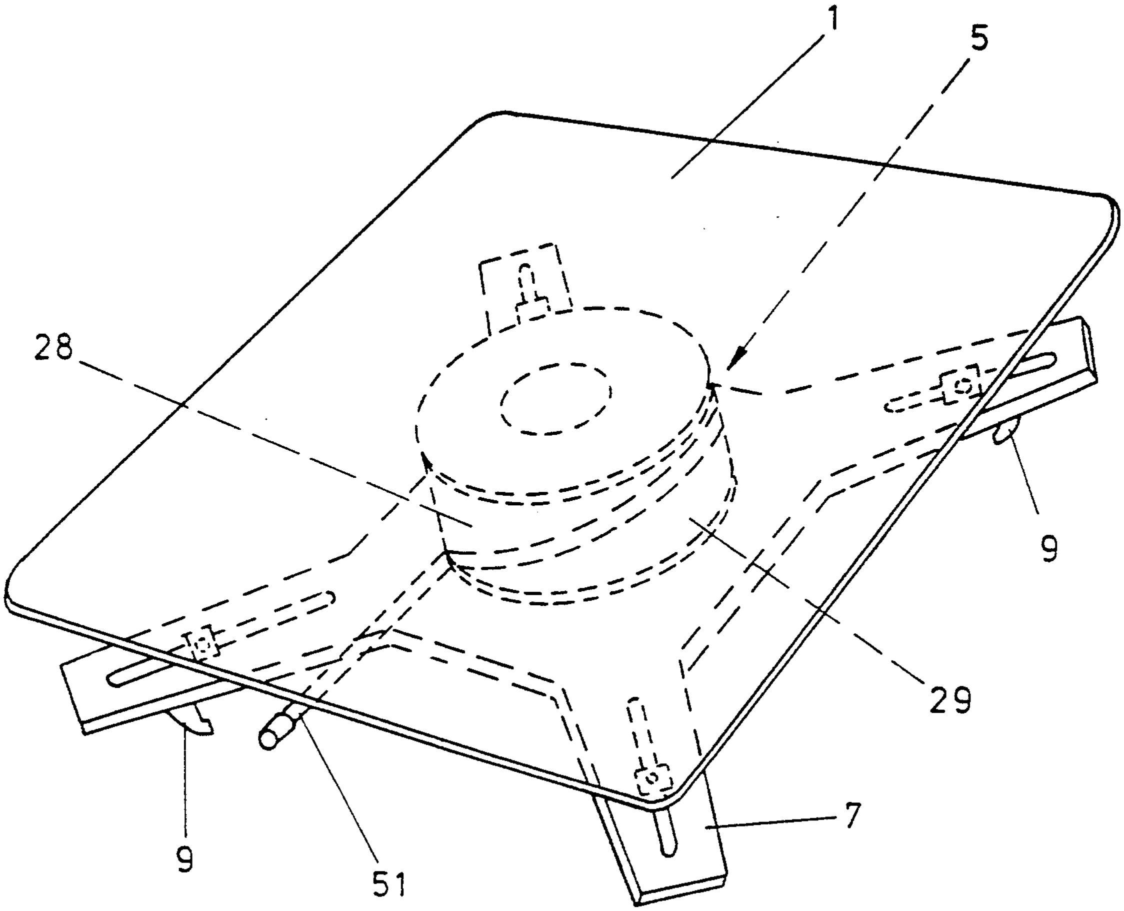
FIG. 10 is a perspective view of a second embodiment of drawing apparatus.

FIG. 10 shows a second embodiment of drawing apparatus in accordance with this invention, comprising a drawing board 1 having a tilt coupling device 5 mounted to its underside, the device 5 being secured on a mounting member 7 which is attachable to a vehicle steering wheel. The member 7 has four radially projecting arms provided with hooks 9 for engaging around the rim of the steering wheel: the hooks are slidable relative to the member 7 so that they can be slid inwards to engage the wheel once the assembly has been placed on the latter.

Figure 11:
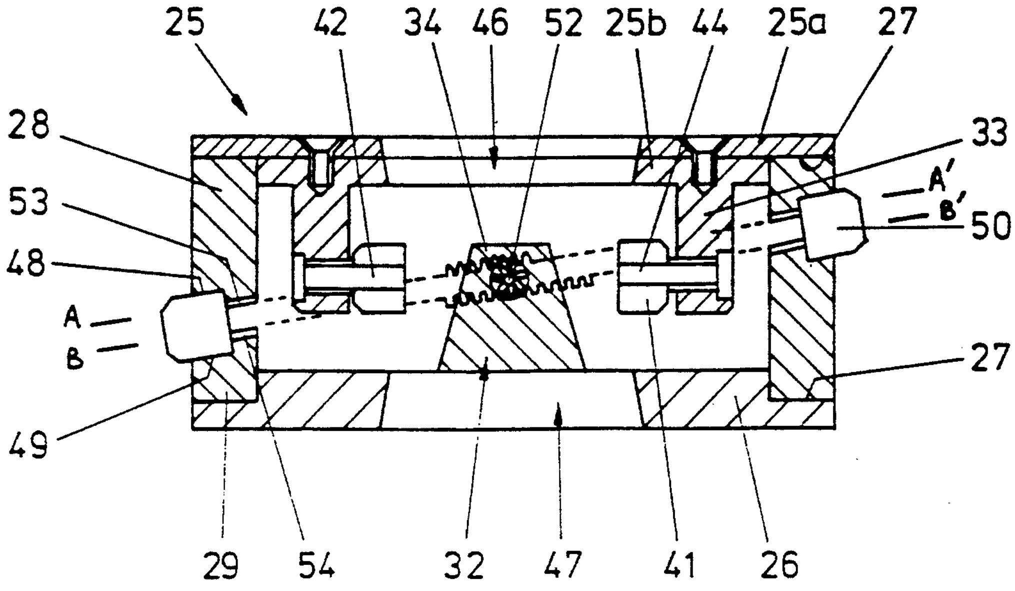
FIG. 11 is an axial section through a tilt coupling device forming part of the drawing apparatus of FIG. 10.
Figure 12:
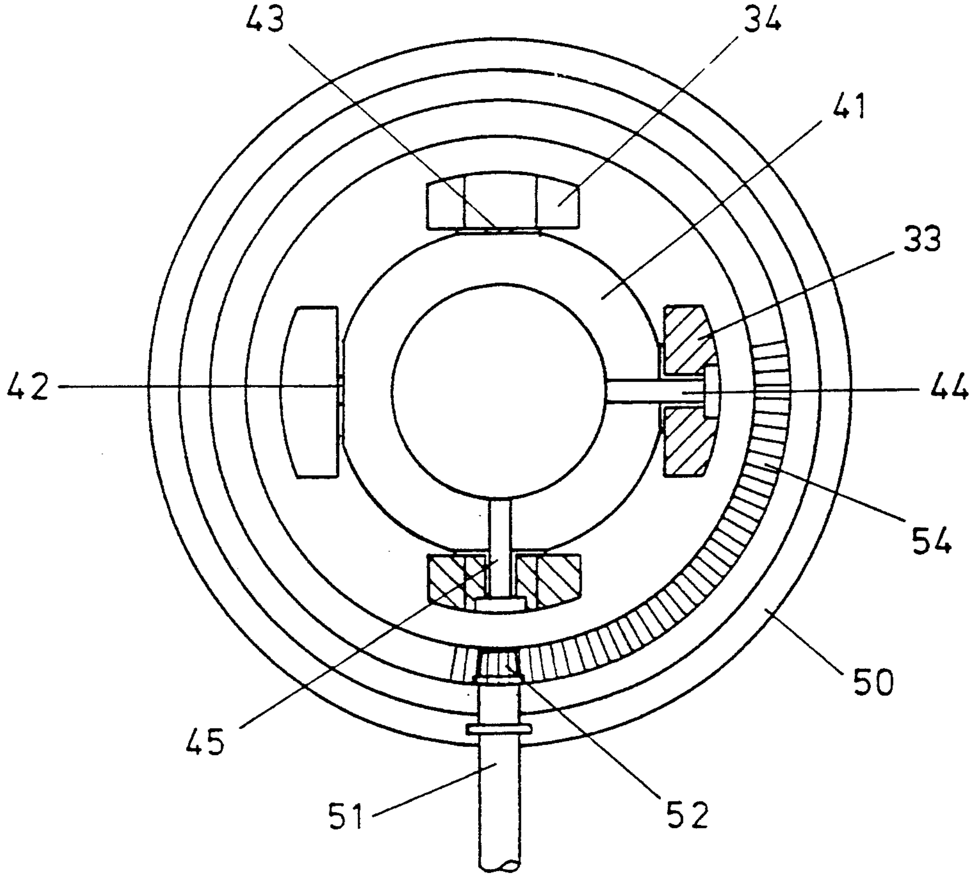
FIG. 12 is a plan view, partly in section, of the lower cam member of the tilt coupling device.

The tilt coupling device includes a pair of axially spaced circular top and bottom plates 25, 26 (shown only in FIG. 11) each having an annular locating shoulder 27 on its inner face, which in the case of the top plate 25 is formed by two plate sections which are fastened together. The top and bottom plates 25 and 26 also contain central apertures 46 and 47, which enables the device to be used in certain optical applications (instead of in the drawing apparatus) where it is necessary for light, or a beam of light, to pass axially through the device. The top and bottom plates are axially spaced by two cam members 28, 29 which can be axially aligned to define a hollow cylinder, as shown. The opposite outer ends of the two cam members are located in the shoulders 27 of the top and bottom plates so that each plate 25 or 26 may be turned relative to its respective cam member, whereas the adjacent ends of the cam members are formed on parallel planes A—A', B—B' which are inclined to the axis of the cylinder. The opposed, arcuate faces of the cam members are provided with external annular female shoulders 48 and 49 which receive and locate an intervening slip ring 50. A radially extending operating shaft 51 is rotatably mounted in the slip ring, and the inner end of the shaft carries a toothed pinion 52 which engages two sets of radially extending, circumferentially spaced teeth 53, 54 formed on the opposed faces of the cam members 28 and 29.

The plates 25 and 26 are held together by a universal joint indicated generally at 32. This joint comprises two pairs of diametrically opposed limbs 33 and 34, one pair being secured to each of the plates 25 and 26. A ring 41 is located between the limbs 33 and 34 and is pivotaly coupled thereto by two pairs of pivot pins 42–45 to pivot about two mutually perpendicular axes. The universal joint thus permits angular displacement of the plates 25 and 26 whilst at the same time preventing relative rotation between the plates about their axes.

In use, the plates 25 and 26 are secured to two components which are required to be angularly adjustable relatively to each other: in the case of the drawing apparatus shown in FIG. 10, the top plate is fixed to or forms part of the drawing board 1 and the bottom plate is fixed to or forms part of the mounting member 7. The cams are relatively rotated to alter the inclination of the mounting plates by rotating the operating shaft 51 about its own axis. Thus, the top and bottom plates 25, 26, and hence the components to which they are connected, will gradually move from a parallel position to a mutually inclined position. The maximum relative inclination is twice the angle between plane A—A' or B—B' and the axis of the respective cam member. The direction of inclination of the plates 25 and 26 can also be adjusted through 360° whilst the angle of inclination remains the same, by rotating the shaft circumferentially of the plates so that the cam members rotate together with each other and relative to the top and bottom plates.

In some applications it may be sufficient for the two series of teeth 53, 54 to extend for less than 360° around the cams, say through 110°. The opposed faces of the cam members 28 and 29 and the respective plates 25 and 26 could be provided with thrust bearing in applications where the coupling could be used to transmit a drive torque. In this case the universal joint 32 could be replaced by a constant velocity joint to ensure a smoother transmission of rotational movement when the coupling is set at an angle.

I claim:

1. A tilt coupling device comprising first and second mounting members having two wedge-shaped cam members, at least one of the cam members being rotatable relative to the other cam member and to the adjacent mounting member in order to change the inclination of one mounting member relative to the other, the device further comprising a series of teeth formed on one of the cam members, and a pinion meshed with said series of teeth and carried on an operating shaft such that rotation of the operating shaft causes rotation of said one cam member relative to the other.

2. A tilt coupling device as claimed in claim 1, comprising a slip ring disposed between the opposed cam surfaces of the two cam members, the operating shaft being mounted to the slip ring and the pinion being meshed both with said series of teeth formed on said one cam member and with a series of teeth formed on the other cam member.

* * * * *